March 4, 1958     W. L. GEDEROS     2,825,173
FISH HOOK
Filed Nov. 5, 1956
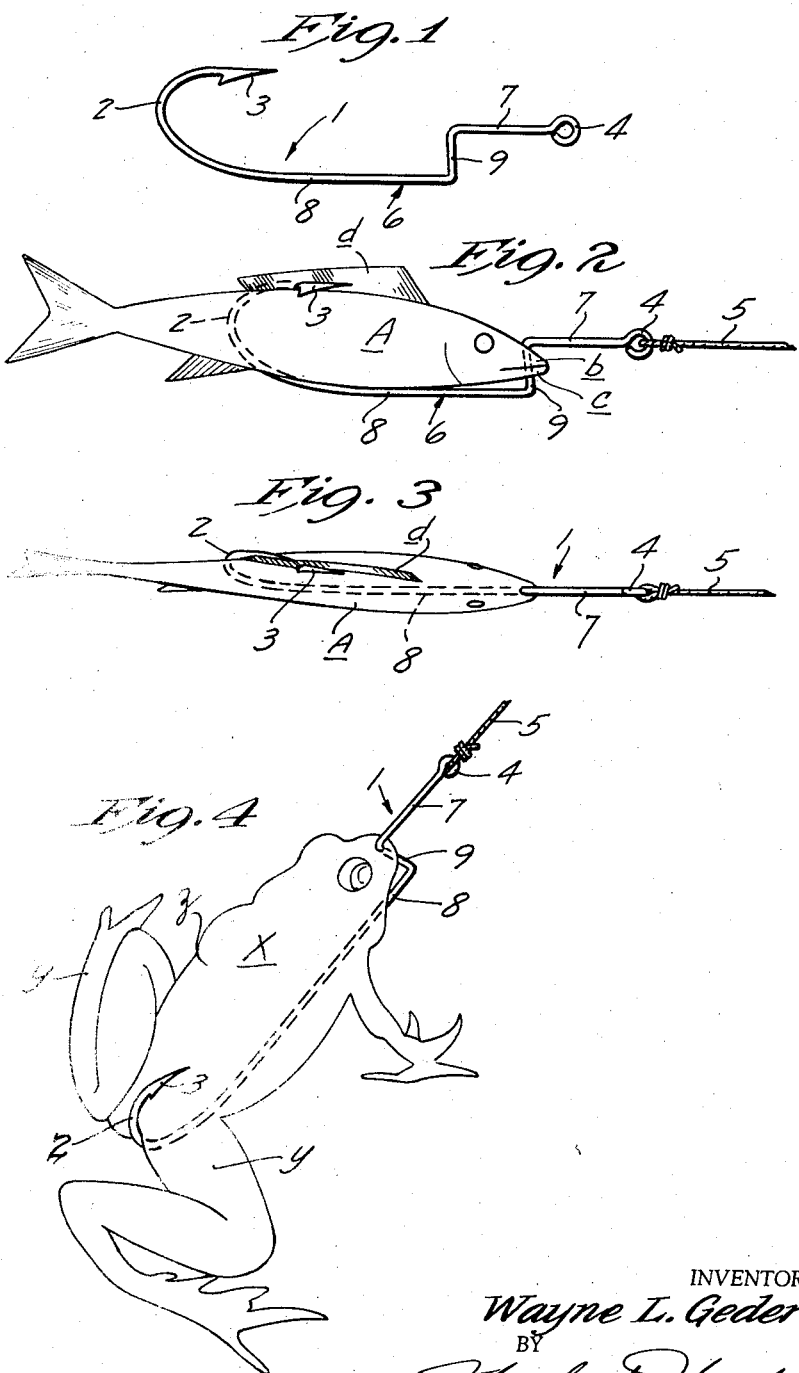
INVENTOR.
Wayne L. Gederos
BY
Merchant & Merchant
ATTORNEYS

2,825,173

FISH HOOK

Wayne L. Gederos, Lake City, S. Dak.

Application November 5, 1956, Serial No. 620,304

4 Claims. (Cl. 43—44.2)

My invention relates to improvements in fish hooks and has for its primary object, the provision of novel means for the mounting of live bait such as minnows, frogs, crayfish, and the like, in a natural position with the barbed hook thereof in a position to be most effective.

Another object of my invention is the provision of a fish hook which, by virtue of its novel design, enables one to mount live bait thereon in a manner to render said hook not only more weedless than hooks heretofore produced, but also more efficient in its ability to catch fish thereon, than hooks heretofore produced.

A further object of my invention is the provision of a fish hook upon which live minnows or the like may be mounted without clamps or such, which are visible to the fish, and in which the minnow is, and appears natural, and hence will stay alive much longer than conventional bait-mounting hooks.

A still further object of my invention is the provision of a device of the class described which, while novel in design, may be manufactured as cheaply as conventional fish hooks and which has the strength of conventional fish hooks.

The above and still further objects of my invention will become apparent from the following detailed specification, appended claims, and attached drawings.

Referring to the drawings wherein like characters indicate like parts throughout several views:

Fig. 1 is a view in side elevation of my novel fish hook,

Fig. 2 is a view corresponding to Fig. 1, but illustrating use thereof in the mounting thereon of a live minnow, Fig. 3 is a view in top plan of the hook and minnow illustrated in Fig. 2, and Fig. 4 is a perspective view illustrating the use of my novel hook in the mounting of a live frog thereon.

Referring with greater particularity to the drawings, the numeral 1 indicates in its entirety my novel hook, formed from a single length of metallic wire stock to provide at its rear end a forwardly opening hook element 2, the barb of which is identified by the numeral 3. At its forward end the hook 1 is formed to provide a closed anchoring loop 4 for a conventional fish line 5. Connecting the hook element 2 and the anchoring loop 4 is a shank 6 comprising front and rear parallel shank sections 7 and 8 respectively, and an intermediate connecting shank section 9 which projects abruptly laterally outwardly from the front shank section 7 in a direction generally away from the barbed end 3 of the hook element 2, and in the same general plane thereof.

Preferably, the linear dimension of the intermediate shank section 9 is approximately one-half the lateral distance between the barbed end 3 of the hook element 2 and the rear shank section 8. This is important, as shown particularly in Fig. 2, in that the projected axis of the front shank section 7, to which the anchoring loop 4 is attached, is substantially intermediate the barbed end 3 of the hook element 2 and the rear shank section 8.

Also preferably, and as shown particularly in Figs. 1 and 2, the connecting shank section 9 cooperates with said front and rear shank sections 7 and 8 to define respectively therebetween acute angles. This feature is of importance in that it precludes accidental dislodgment of the upper and lower jaws of a fish, frog, or the like, thereform when the particular bait is mounted thereon, as shown either in Fig. 2 or Fig. 4.

When it is desired to mount a live minnow A on my novel hook 1, the barbed end 3 of the hook element 2 is passed downwardly through the upper and lower jaws b and c respectively, and the rear shank sections 8 threaded therethrough until said jaws b and c are positioned upon the angular intermediate shank section 9, as shown in Fig. 2. Finally, the hook element 2 is caused to pass upwardly through the rectum of the minnow A with the barb 3 protruding outwardly adjacent the dorsal fin d. Alternatively, and as shown in Fig. 2, the hook element 2 is merely caused to engage one side of the minnow A with the barbed end 3 thereof being made to pass through the dorsal fin d from the opposite side. In either event, the minnow A is retained in a natural position—one in which it will remain alive for a maximum period of time. Note that in both instances, the rear shank section 8 underlies the belly of the minnow A and acts as a keel upon which the minnow A rides, below the line of drag, represented by the line 5 connected to the anchoring loop 4. This arrangement renders the baited hook 1 relatively weedless.

As shown in Fig. 4, when my novel hook 1 is used to mount a live frog X thereon, the barbed end 3 is likewise caused to pass through the upper and lower jaws, in order named, and the rear shank section 8 threaded through the jaws until said jaws are received on the intermediate connecting shank section 9. Finally, the hook element 2 is caused to pass upwardly between the legs y of the frog X with the barbed end 3 thereof overlying and in close engagement with the back z. If desired, the hook element 2 may be caused to pass through the rear end portion of the body of the frog X in close proximity to the crotch defined by the legs y. In either event, the rear shank section 8 also forms a keel upon which the frog rides as it is pulled through the water, said keel tending to maintain the frog X in an upright position, identically as it does with the minnow A.

It should be obvious that my novel hook 1 may be used with crayfish, chubs and countless other live bait. However, in all such cases, the front portion of the bait is anchored to the connecting shank member 9, the rear end portion is caused to pass through the hook element 2 and the rear shank section 8 passes under the bait and acts as a keel to maintain same in an upright position. In light of this, it should be obvious that the length of the rear shank section 8 with respect to the linear dimensions of the connecting shank section 9, will vary according to the size of the bait used. However, there is a very definite relationship between the linear dimension of said rear shank section 8 and said connecting shank section 9 which I have found to be approximately six (6) to one (1), that is the length of the rear shank section 8 is approximately six (6) times that of the connecting shank section 9. The reason for this is that the larger the fish, frog, or the like, the greater the thickness of the jaws thereof.

My invention has been thoroughly tested and found to be completely satisfactory for the accomplishment of the above objects and while I have disclosed a preferred embodiment thereof, same is capable of modification without departure from the scope and spirit of the invention as defined by the appended claims.

What I claim is:

1. A fish hook having a forwardly opening barbed hook element at its rear end, a closed anchoring loop at its front end, and a shank connecting said hook element and said loop, said shank comprising front and rear parallel sections and an intermediate section which projects abruptly laterally outwardly from the front shank section in a direction generally away from the barbed end of said hook element.

2. The structure defined in claim 1 in which said intermediate section cooperates with said front and rear parallel sections to define acute angles respectively therebetween.

3. The structure defined in claim 1 in which the linear dimension of said intermediate section is approximately one-half the lateral distance between the barbed hook element and said rear parallel section.

4. The structure defined in claim 1 in which the linear dimension of said intermediate section is approximately one-sixth the linear dimension between said intermediate section and the rearmost portion of said barbed hook element.

References Cited in the file of this patent
UNITED STATES PATENTS

| | | |
|---|---|---|
| 2,164,807 | Evans | July 4, 1939 |
| 2,534,469 | Moore | Dec. 19, 1950 |